United States Patent
Ganthaler et al.

(10) Patent No.: US 10,086,695 B2
(45) Date of Patent: Oct. 2, 2018

(54) LIQUID TANK INCLUDING INTEGRATED SURFACE STRUCTURE

(71) Applicant: Röchling Automotive SE & Co. KG, Mannheim (DE)

(72) Inventors: Christoph Ganthaler, Naturns (IT); Walter Kral, Sarntal (IT)

(73) Assignee: Röchling Automotive SE & Co. KG, Mannheim (DE)

( * ) Notice: Subject to any disclaimer, the term of this patent is extended or adjusted under 35 U.S.C. 154(b) by 0 days.

(21) Appl. No.: 15/176,753

(22) Filed: Jun. 8, 2016

(65) Prior Publication Data

US 2016/0361996 A1 Dec. 15, 2016

(30) Foreign Application Priority Data

Jun. 11, 2015 (DE) .......................... 10 2015 210 682

(51) Int. Cl.
| | | |
|---|---|---|
| B60K 15/077 | (2006.01) | |
| B60K 15/03 | (2006.01) | |
| B60K 13/04 | (2006.01) | |
| B29C 45/00 | (2006.01) | |
| B29C 65/00 | (2006.01) | |
| B29L 31/00 | (2006.01) | |

(52) U.S. Cl.
CPC ............ *B60K 15/077* (2013.01); *B60K 13/04* (2013.01); *B60K 15/03177* (2013.01); *B29C 45/006* (2013.01); *B29C 66/54* (2013.01); *B29L 2031/7126* (2013.01); *B60K 2015/03032* (2013.01); *B60K 2015/0344* (2013.01); *B60K 2015/03493* (2013.01); *B60K 2015/0777* (2013.01)

(58) Field of Classification Search
CPC .......... B60K 15/077; B60K 2015/0775; B60K 2015/0777; B60K 2015/0344
USPC ......................................................... 220/563
See application file for complete search history.

(56) References Cited

U.S. PATENT DOCUMENTS

| 5,127,432 A | 7/1992 | Duhaime et al. |
| 2007/0017918 A1* | 1/2007 | Kirk ........................ A01D 34/82 |
| | | 220/563 |

FOREIGN PATENT DOCUMENTS

| CN | 101061015 | 10/2007 |
| CN | 2003372060 | 1/2014 |
| CN | 204263935 | 4/2015 |

(Continued)

OTHER PUBLICATIONS

Search Report issued for German Patent Application No. 10 2015 210 682.9 dated Feb. 2, 2016 with machine English translation (13 pages).

(Continued)

*Primary Examiner* — J. Gregory Pickett
*Assistant Examiner* — Allan Stevens
(74) *Attorney, Agent, or Firm* — Prince Lobel Tye LLP

(57) ABSTRACT

A liquid tank includes a tank wall enclosing a tank volume and at least one relief structure facing the tank volume on an inner side of the tank wall. The relief structure is formed as one-piece with the tank wall. Two shell parts can be joined along a joining surface to make a section of the tank wall. One of the shell parts can include a tank bottom. At least one part of the relief structure can be formed on the tank bottom. The relief structure can include projections protruding into the tank volume along a local direction of projection.

10 Claims, 1 Drawing Sheet

(56) References Cited

FOREIGN PATENT DOCUMENTS

| | | |
|---|---|---|
| DE | 10 2013 210 742 A1 | 12/2014 |
| EP | 1 759 827 A1 | 3/2007 |
| EP | 1790516 | 5/2007 |
| WO | 2014/00147014 | 9/2014 |

OTHER PUBLICATIONS

Chinese Office Action issued in CN 201610404891.6 dated Feb. 2, 2018.

* cited by examiner

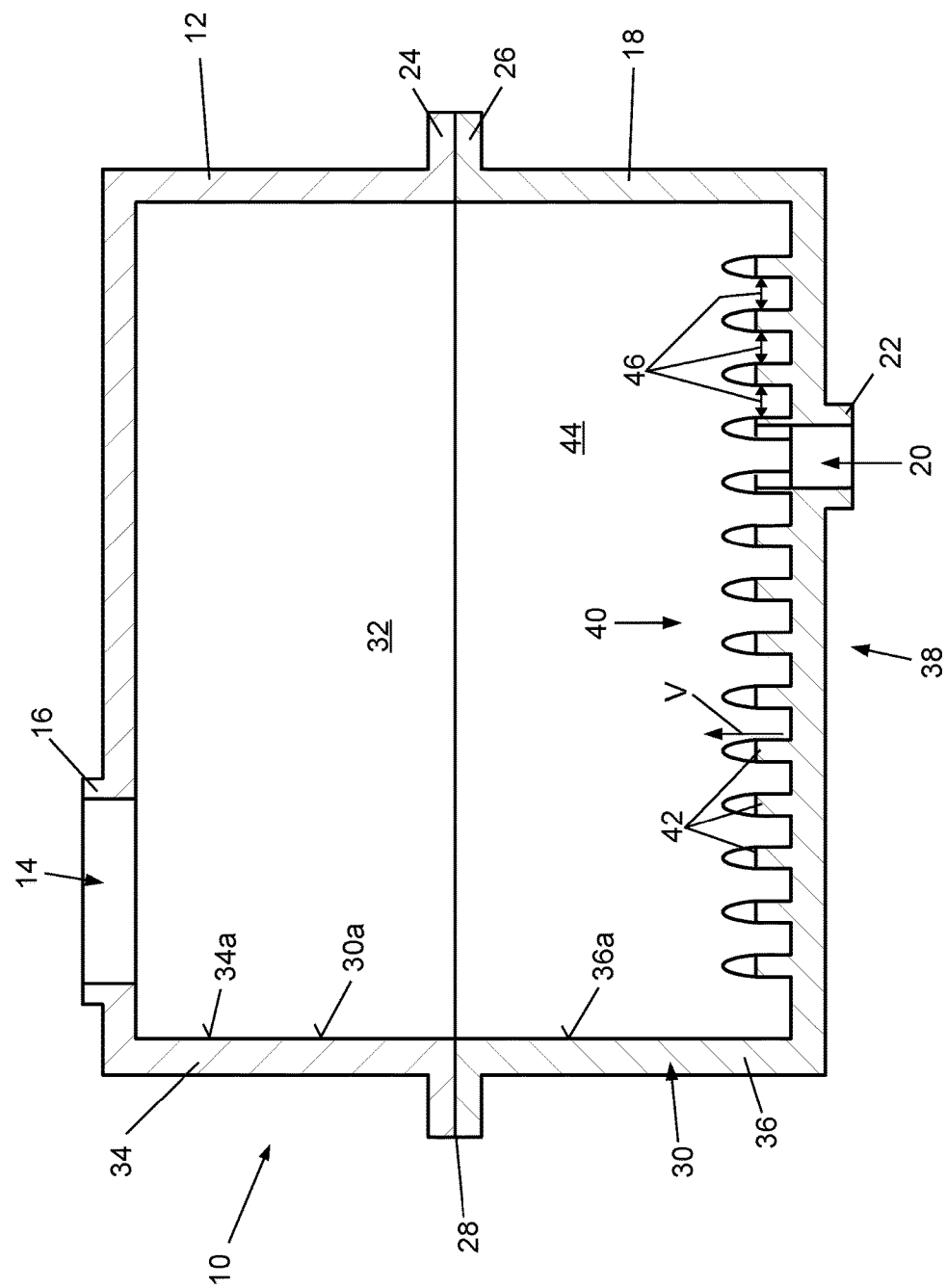

LIQUID TANK INCLUDING INTEGRATED SURFACE STRUCTURE

CROSS REFERENCE TO RELATED APPLICATION(S)

This application claims priority to German Application No. 10 2015 210 682.9, filed Jun. 11, 2015. The entirety of the disclosure of the above-referenced application is incorporated herein by reference.

BACKGROUND OF THE INVENTION

Field of the invention

The invention relates to a liquid tank, in particular for motor vehicles, including a tank wall enclosing a tank volume, on the inner side of which tank wall facing the tank volume a relief structure is provided, at least in sections, facing the tank volume.

Particularly in the case of liquid tanks that are designed and intended for installation in motor vehicles, the liquid intended for filling the tank can be readily determined. In principle a liquid tank is suitable for receiving any liquid, as long as the materials used to make the liquid tank are sufficiently stable with respect to a chemical and physical influence of the liquid it is intended to hold. However in motor vehicles in particular, a separate tank is very clearly provided for each operating liquid that is to be stored in the motor vehicle, which separate tank is designed and intended to hold the respective operating fluid. The design is based on the choice of appropriate materials for fabricating the tank, which materials are chemically and physically sufficiently stable with respect to the liquid that is to be contained. The intended purpose is indicated by corresponding markings on the tank and/or by the line connections or routings. The user of the motor vehicle therefore has no choice of which operating fluid he should fill into which tank.

There has been a great deal of discussion in the prior art of how a relative movement of the fluid contained in a tank can be at least impeded relative to the tank containing it. The motive behind this can simply be noise suppression, for example preventing noise emissions due to the liquid sloshing against the tank wall. However the motivation can also be a prevention of undesirable electrostatic charging of the contained liquid due to relative movement of liquid regions relative to one another.

Description of the Related Art

The solutions offered in the prior art for suppressing a liquid movement in a liquid contained in a liquid tank provide, for example, a fiber structure disposed on the inner side of the tank wall, as proposed in DE 38 80 271 T2. Here the fiber structure can be a woven fabric, a fabric, but preferably a tangle of fibers. Here the fiber structure forms a relief structure that deviates from the otherwise smooth inner surface of the tank wall in the sense of the present application.

A liquid tank is known from DE 39 05 611 C2 wherein separate impact elements are provided on the inner surface of the tank wall, in its corner areas, and in its intermeshing areas. Impact elements are applied in the corner areas and intermeshing areas with the aim of minimizing the loss in tank volume to the detriment of the amount of liquid that can be contained. These impact elements can also have a relief structure that deviates from a smooth surface. Thus the exposed surface of an impact element according to DE 39 05 611 C2 facing the tank volume can have an undulating profile or brush-type protruding plastic needles.

DE 100 62 154 A1 also discloses a liquid tank wherein a thread-type structure for noise abatement is provided. In contrast to the liquid tank in the previously mentioned documents, in the liquid tank in DE 100 62 154 A1, the thread-type structure extends throughout the tank volume and is supported by or attached to the tank wall at its longitudinal ends.

A liquid tank is known from U.S. Pat. No. 3,400,854 A, which on the one hand is coated on its inside with a rubber layer, and on the other hand is filled as completely as possible with hollow bodies. In contrast to the previously presented liquid tanks in the prior art, the rubber layer includes no relief structure, but instead is rather smooth on its inner side that is exposed to the tank volume. The rubber layer also serves to seal the tank. The hollow bodies that have been filled into the tank volume serve to reduce a sloshing movement of the liquid in order to reduce possible noise emission from the tank.

A liquid tank for a motor vehicle is also known from U.S. Pat. No. 8,235,241 B2, in the tank volume of which liquid tank hollow bodies are contained. Whereas the tank volume of the previously mentioned liquid tank is filled to the greatest extent possible with loose hollow bodies, the tank volume of the presently discussed liquid tank from the prior art is significantly larger than the volume of the hollow bodies with which it has been filled. However, the hollow bodies filling the tank volume are connected to each other in a net-like manner, wherein the hollow-body network is anchored on the inner side of the tank wall in the corner regions thereof with a certain degree of relative mobility relative to the tank wall.

All of these solutions in the prior art have in common that a physical structure provided to reduce a sloshing movement of the contained liquid is fabricated separately from the tank and is joined to the inner side of the tank in an assembly process. A disadvantage of these solutions is the high expense of fabrication and assembly required to make the known liquid tank.

SUMMARY OF THE INVENTION

The object of the present invention is thus to further develop the liquid tank of the above-described type, such that with the same capacity for reducing a sloshing movement of a liquid contained in the liquid tank, it is manufacturable with less expense.

According to a first aspect of the present invention, this objective is achieved by a liquid tank of the above-described type, wherein the relief structure is configured as one-piece with the tank wall. Due to the at least sectionally one-piece configuration of the tank wall, i.e., by forming at least one section of the inner side of the tank wall facing the tank volume as a relief structure, the separate fabrication of a relief structure element, as is necessary in the prior art described above, can be omitted. With the elimination of a separate fabrication of a relief structure element, the necessity of mounting it on the tank wall is also eliminated.

In principle, it can be considered to initially form the tank wall as a tank-wall blank of relatively large thickness and to incorporate the desired relief structure into the thick wall formed in this manner by removing material. For example, the relief structure can be sectionally cut, milled, melted, etc., into an inner side of the tank-wall blank.

However, because the step of material removal also involves expense, in order to avoid this step it is considered that the tank wall, in at least the section including the relief structure, is made of a castable material. There is therefore the possibility, already when casting the tank wall, to completely form not only a tank shell, but also the desired relief structure. Thus in a suitably designed casting step the tank wall, or at least one section thereof, including a relief structure, can be formed ready for use.

In order to ensure the simplest possible manufacture, the tank wall is preferably one-layer. Then, according to the above further development of the present invention, the tank wall is preferably formed, throughout its entire thickness, of the castable material.

Depending on the liquid to be contained or also on other circumstances the tank wall of the liquid tank can be designed as having multiple layers, wherein the individual layers of the tank wall follow in succession in the direction of thickness of the tank wall. In this case, the inventive simplification of the manufacturing and assembly process for fabricating the liquid tank of the present invention can still be achieved if at least one exposed inner layer of the tank wall facing the tank volume is formed of the castable material.

The castable material can be any material, however castable materials are preferred due to the associated high design flexibility. Due to their high chemical resistance, plastics are preferred as the material for forming the liquid tank. A preferred castable material is therefore a thermoplastic.

In order to be able to form particularly large areas of the inner side of the tank wall with a relief structure, it is preferred that the liquid tank have at least two shell parts. The shell parts, which can be put together later to form a tank-wall section, or even the fluid tank itself, are particularly advantageously amenable to a shaping processing for forming the relief structure. Thus the entire subsequent inner side of one shell part can be amenable to casting, or also to reshaping to form the relief structure.

If the liquid tank is made of a plurality of joined shell parts, it is advantageous if at least one part of the relief structure is formed on the tank bottom, i.e. on a shell part comprising a tank bottom. It is expressly pointed out that even when the tank is formed of one-piece—for example by blow molding—the arrangement of at least one part of the relief structure on the tank floor is preferred, because the tank bottom, of all the inner-wall sections of the liquid tank, is always in contact longest with the contained liquid and can thus prevent undesired sloshing movements the longest. However, it is clear that the relief structure can in principle be formed on any inner wall sections of the tank, even on the entire inner wall.

In principle the term "relief structure" in the present application refers to any surface structure that deviates from a smooth surface. Referred to here are, in particular, macroscopic deviations from a smooth surface, i.e., deviations that are readily discernable to the naked eye and are readily perceptible to the human hand. Microscopic deviations, such as for example a roughening of a surface in order to achieve the so-called "lotus effect" are not included under the term "relief structure" in the present application, because microscopic deviations of this kind are not recognizable by the naked eye. A surface that has been prepared in order to achieve the lotus effect will be perceived by the human eye, and also by the human hand, as smooth.

The purpose of the relief structure of the present application is not to change the wetting of the inner side of the tank wall by the liquid contained in the tank, but rather to influence the movements of liquid, at least in the region near the tank wall. It is therefore preferable that the relief structure includes projections that protrude into the tank volume along a local direction of projection. The direction of projection can differ locally, because depending on the local curvature of the inner side of the tank wall, projections provided at different points can in each case protrude orthogonally inward from a tank-wall section without necessarily being parallel.

In order to effectively suppress a liquid movement at least in the region near the tank wall, it is advantageous if the projections are arranged orthogonally to their respective direction of projection with spaces between them, so that liquid can be accommodated between two adjacent projections.

In order to avoid unwanted capillary effects, it is preferable that the average distance between two immediately adjacent projections be no less than one-third of the average thickness of the two projections. Here the average thickness is a thickness averaged both across the height of the projection orthogonal to the inner side of the tank wall and across its length along the inner side of the tank wall. If the two projections do not have the same thickness—possibly because they have different shapes—the averaged thickness naturally also relates to the different thicknesses of the projections. The same applies mutatis mutandis for the average distance between two projections.

Furthermore, in order to prevent an unwanted liquid flow from occurring between two projections, the average distance between two immediately adjacent projections is preferably not larger than five times the average thickness of the two projections.

The average thickness of a projection preferably falls within the range of 0.2-5 times the average thickness of the tank wall.

In order to ensure prevention of sloshing movements without giving up too much tank volume the average projection height of the projections of the relief structure is preferably not less than half the average thickness of the tank wall and also advantageously not more than 10 times the average thickness of the tank wall.

In principle, the liquid tank can be designed to hold any liquid, in particular a motor-vehicle operating liquid. It is particularly preferable if the liquid tank of the present invention is a so-called "SCR tank," which is designed and intended to hold aqueous urea solution. This is drawn from the tank for selective catalytic reduction for the purpose of exhaust-gas cleaning in the motor vehicle.

The present invention therefore also relates to a motor vehicle including a liquid tank as described and further developed above.

According to a second aspect of the present invention, the object mentioned above is also achieved by a method for manufacturing a liquid tank as described and further developed above, wherein the method includes at least the following steps:

Providing a castable mass

Casting the mass, among other things into a tank-wall section including a relief structure facing the interior of the liquid tank that is to be manufactured.

The advantage of casting fabrication of at least the tank-wall section including the relief structure together with the relief structure in a single casting step has already been described in detail above. The casting step can naturally be followed by the usual finishing steps, such as deburring or similar The casting step is preferably a casting method, because casting methods allow considerable design freedom. Particularly many similar components are obtainable with a short cycle time and repeatable dimensional accuracy using injection molding, which is why the casting step particularly preferably comprises an injection molding method. Here the relief structure can be designed as a negative form in a shaping step of the mold-wall of an injection molding form, so that—as already described above—the desired relief structure is manufacturable with high precision via the injection molding process during the fabrication of the tank-wall component or of the tank.

In order to facilitate the formation of the relief structure on an internal wall section of the inventive liquid tank, the inventive method, for the reasons already given above, preferably comprises a casting fabrication of at least two shell parts and a joining thereof. Each of the shell parts preferably comprises a subsequent section of the inner side of the tank wall facing the tank volume.

Particularly preferably the liquid tank is formed of exactly two shell parts, i.e., in a fully assembled state an upper shell wherein, for example, a filling opening can be formed, and in a fully assembled state a lower shell which comprises the tank bottom mentioned above, and wherein a withdrawal opening can be made. The inventive method therefore preferably comprises a casting of exactly two shell parts that are joined to make the liquid tank.

BRIEF DESCRIPTION OF THE DRAWING FIGURES

The present invention will be explained below based on the accompanying drawings. The drawing designated as FIG. 1 shows a roughly schematic, longitudinal-section view through an inventive embodiment of a liquid tank.

In FIG. 1 an inventive liquid tank is generally designated with 10. The liquid tank 10 preferably comprises an upper shell part 12, which includes a filling opening 14 including a flanged rim 16 surrounding the filling opening 14. A filling line, for example, a filling pipe not shown in FIG. 1, can be connected to the flanged rim 16.

DETAILED DESCRIPTION OF THE PREFERRED EMBODIMENTS

The liquid tank 10 also comprises a lower shell part 18 that includes a withdrawal opening 20 including a flanged rim 22 surrounding the withdrawal opening 20. A withdrawal line not shown in FIG. 1 can in turn be connected to the flanged rim 22.

The upper shell part 12 and the lower shell part 18 are preferably joined to each other, for example glued or welded, along a respective circumferential joining flange 24 or 26. The joining flanges 24 and 26 come into contact with each other along a joining surface 28, which is preferably flat.

The tank 10 includes a tank wall 30 that surrounds a tank volume 32 of the tank 10. The tank wall 30 is formed, on the one hand, by the wall 34 of the upper shell part 12, and is formed on the other hand by the wall 36 of the lower shell part 18.

An inner side 30a of the tank wall 30 forms a boundary surface of the tank wall with respect to the tank volume 32. The inner side 30a is in turn formed, on the one hand by the inner side 34a of the wall 34 of the upper shell part 12, and is formed on the other hand by the inner surface 36a of the wall 36 of the lower shell part 18.

The liquid tank 10 can of course, deviating from the example shown, include more than two shell parts, or it can also be formed one-piece, for example by blow molding.

In a bottom section 38 of the tank 10, more precisely the lower shell part 18, a relief structure 40 is formed on the inner side 30a or inner surface 36a facing the tank volume 32. The relief structure 40 is formed as one-piece in a materially continuous manner with the tank 10, in particular with the lower shell part 18.

The lower shell part 18—like the upper shell part 12—is preferably manufactured by injection molding.

In the example shown, the relief structure 40 formed at the same time as the injection molding of the lower shell part 18 includes similar projections 42 which protrude from the bottom section 38 of the lower shell part 18 along a direction of projection V into the tank volume 32. In the example shown, the projections 42 extend, independently of their location, at substantially uniform height, parallel to one another, in a direction of extension that is orthogonal to the drawing plane of FIG. 1. For example, the projections 42 can also extend a short distance away on the lateral wall 44 to the joining surface 28.

Immediately adjacent projections 42 are disposed spaced from one another by spacings 46 in a direction orthogonal both to the direction of projection V and to the direction of extension of the projections 42. In FIG. 1, the direction of spacing is parallel to the drawing plane.

All projections 42 in the example shown are preferably identical, as are the spacings 46 between the adjacent projections 42.

In the example shown, the spacings 46 are slightly larger than the thicknesses of the projections 42, which thicknesses are to be measured in the same direction. The spacings 46 are dimensioned such that they are too large for the formation of capillary effects between mutually facing side walls of immediately adjacent projections 42, and so that they are too small for the formation of significant liquid flows in the direction of the spacing in the partial volumes lying between immediately adjacent projections 42.

The thickness of the projections 42 is selected such that they remain stable during the anticipated operating life of the liquid tank 10.

When choosing the usual materials for fabricating the upper shell 12 and the lower shell 18, i.e., for example, thermoplastics, an optimum ratio of approximately 0.2 to 3 results of projection thickness to spacing 46 measured in the same direction between two adjacent projections 42. In the example shown, the ratio of projection thickness to spacing 46 is slightly smaller than 1, approximately 0.85, because the spacing 46 is somewhat larger than the thickness of the associated projections 42.

The upper and lower shell parts 12 and 18 can respectively be fabricated in an injection mold in one step and then joined to each other at their joining flanges 24 and 46. Here, the relief structure 40 is formed immediately during the casting fabrication of the lower shell part 18. There is thus no need to form a relief structure on a separate component and connect the separate component to one of the shell parts 12 and 18, which considerably reduces the expense of producing the liquid tank 10 presented here compared to the prior art.

In principle, the liquid tank shown in FIG. 1 can hold any liquid, in particular operating liquids for motor vehicles. Particularly preferably the liquid tank 10 is an SCR tank, which is configured and intended to hold aqueous urea solution, which in turn is used in motor vehicles for the selective catalytic reduction of exhaust gasses, and thus for exhaust-gas cleaning. Aqueous urea solution for this purpose that is available commercially is known under the trade name ADBLUE®.

The invention claim is:

1. A liquid tank comprising:
a tank wall enclosing a tank volume; and
at least one relief structure facing the tank volume on an inner side of the tank wall;
wherein the at least one relief structure is formed as one-piece with the tank wall,
wherein at least two shell parts are joined along a joining surface to make a section of the tank wall,
wherein at least one of the shell parts comprises a tank bottom,
wherein at least one part of the at least one relief structure is formed on the tank bottom,
wherein the at least one relief structure comprises projections protruding into the tank volume along a local direction of projection, said projections being arranged orthogonally to their direction of projection with spacing between them,
wherein said projections extend towards said joining surface, and
wherein an average distance between two immediately adjacent projections is not less than one-third and not more than five times an average thickness of the two projections.

2. The liquid tank according to claim 1, wherein at least one exposed inner layer of the tank wall facing the tank volume is made, at least in a section including the at least one relief structure, of a castable material.

3. The liquid tank according to claim 2, wherein the tank wall throughout its entire thickness is made, at least in said section of the tank wall including the at least one relief structure, of a castable material.

4. The liquid tank according to claim 2, wherein the castable material is thermoplastic.

5. The liquid tank according to claim 1, wherein the liquid tank is designed and intended configured to contain aqueous urea solution.

6. The liquid tank according to claim 1, wherein the at least two shell parts are joined to make the liquid tank.

7. A method of fabricating the liquid tank according to claim 1, comprising the following steps:
providing of a castable mass, and
casting the mass to make the section of the tank wall, said tank wall comprising the tank bottom including the at least one relief structure facing the tank volume of the liquid tank that is to be fabricated.

8. The method according to claim 7, wherein the casting step comprises a molding method.

9. The method according to claim 8, wherein the casting step comprises an injection molding method.

10. The method according to claim 7, wherein the method comprises casting the at least two shell parts and joining the at least two shell parts.

* * * * *